US010806251B2

(12) United States Patent
Liss et al.

(10) Patent No.: US 10,806,251 B2
(45) Date of Patent: Oct. 20, 2020

(54) SHELVING UNIT WITH LOAD CAPACITY INCREASING TIE CLIPS

(71) Applicant: Edsal Manufacturing Company, Inc., Chicago, IL (US)

(72) Inventors: Mitchell Liss, Northbrook, IL (US); Anthony J. Troyner, Shorewood, IL (US); Jeff Lamber, Minooka, IL (US); Mitchell E. Bianchin, Villa Park, IL (US)

(73) Assignee: Edsal Manufacturing Company, Inc., Chicago, IL (US)

( * ) Notice: Subject to any disclaimer, the term of this patent is extended or adjusted under 35 U.S.C. 154(b) by 0 days.

(21) Appl. No.: 16/130,398

(22) Filed: Sep. 13, 2018

(65) Prior Publication Data
US 2019/0125077 A1 May 2, 2019

Related U.S. Application Data

(60) Provisional application No. 62/577,498, filed on Oct. 26, 2017.

(51) Int. Cl.
*A47B 47/02* (2006.01)
*A47B 47/00* (2006.01)
*A47B 96/02* (2006.01)
*A47B 57/48* (2006.01)
*F16B 12/32* (2006.01)
*A47B 57/50* (2006.01)

(52) U.S. Cl.
CPC ........ *A47B 47/021* (2013.01); *A47B 47/0083* (2013.01); *A47B 47/027* (2013.01); *A47B 57/48* (2013.01); *A47B 96/021* (2013.01); *A47B 57/50* (2013.01); *A47B 2230/07* (2013.01); *F16B 12/32* (2013.01)

(58) Field of Classification Search
CPC ..... A47B 47/021; A47B 47/027; A47B 57/48; A47B 96/021; A47B 47/0083; A47B 2230/07; A47B 57/50; F16B 12/32
See application file for complete search history.

(56) References Cited

U.S. PATENT DOCUMENTS

| 3,355,134 | A | * | 11/1967 | Chesley | ............... A47B 96/025 108/108 |
| 3,559,219 | A | * | 2/1971 | Molt | ...................... A47C 23/05 5/247 |
| 3,608,105 | A | * | 9/1971 | Flatford | ................. A47C 23/14 5/232 |
| 3,720,960 | A | * | 3/1973 | Bond | ..................... A47C 31/06 5/259.1 |
| 3,990,599 | A | * | 11/1976 | Rowley | .................... B65D 9/12 217/12 R |

(Continued)

*Primary Examiner* — Ko H Chan
(74) *Attorney, Agent, or Firm* — Wood Herron & Evans LLP

(57) ABSTRACT

A shelving unit includes front and rear shelf supporting beams, each beam including an upper shelf supporting flange that defines a shelf seat and a lower flange spaced from the upper flange, a shelf configured to be positioned in the seat defined by the front and rear shelf support beams, and at least one tie clip configured to be connected to the shelving unit between the shelf and the lower flange of at least one of the front and rear shelf supporting beams. A method of assembling a shelving unit is also disclosed.

14 Claims, 4 Drawing Sheets

(56) References Cited

U.S. PATENT DOCUMENTS

| | | | | |
|---|---|---|---|---|
| 4,147,336 A * | 4/1979 | Yamawaki | B60N 2/7041 | 267/111 |
| 4,191,424 A * | 3/1980 | Mundell | A47C 7/20 | 297/452.26 |
| 4,289,304 A * | 9/1981 | Muzzell | A47C 7/285 | 267/112 |
| 4,361,099 A * | 11/1982 | Kokenge | F16B 5/123 | 108/108 |
| 4,597,616 A * | 7/1986 | Trubiano | A61G 12/00 | 211/113 |
| 4,615,686 A * | 10/1986 | Bartos | A63H 17/262 | 446/446 |
| 4,754,505 A * | 7/1988 | Mizelle | A47C 17/16 | 5/13 |
| 5,305,479 A * | 4/1994 | Robinson | A47C 17/04 | 5/13 |
| 5,409,198 A * | 4/1995 | Roick | A47C 31/06 | 24/336 |
| 5,538,325 A * | 7/1996 | Bullard | A47C 7/30 | 297/440.22 |
| 5,913,479 A * | 6/1999 | Westwood, III | B66C 1/36 | 24/298 |
| 5,979,023 A * | 11/1999 | Nutto | B62J 7/08 | 16/406 |
| 6,435,478 B2 * | 8/2002 | Parrish | A01G 17/08 | 254/199 |
| 6,489,566 B1 * | 12/2002 | Durin | H02G 3/0443 | 174/135 |
| 6,520,357 B1 * | 2/2003 | Kautz | A47B 96/061 | 211/151 |
| 6,565,157 B2 * | 5/2003 | Barile, Jr. | A47C 7/282 | 297/440.22 |
| 6,854,804 B2 * | 2/2005 | Cruz Fernandes de Pinho | B60N 2/7094 | 297/452.49 |
| 7,055,786 B2 * | 6/2006 | Garassino | H02G 3/263 | 248/220.22 |
| 7,314,144 B2 * | 1/2008 | Stitchick | A47B 47/022 | 211/125 |
| 7,438,362 B2 * | 10/2008 | Dotta | A47C 7/28 | 29/428 |
| 7,832,572 B2 * | 11/2010 | Wyatt | A47B 47/027 | 211/181.1 |
| 9,215,926 B1 * | 12/2015 | Offerman | A47B 47/02 | |
| 10,098,458 B2 * | 10/2018 | Lindnnark | A47B 96/02 | |
| 2001/0044992 A1 * | 11/2001 | Jahrling | A47B 55/02 | 24/563 |
| 2012/0192925 A1 * | 8/2012 | Grushkowitz | H02S 30/10 | 136/251 |

* cited by examiner

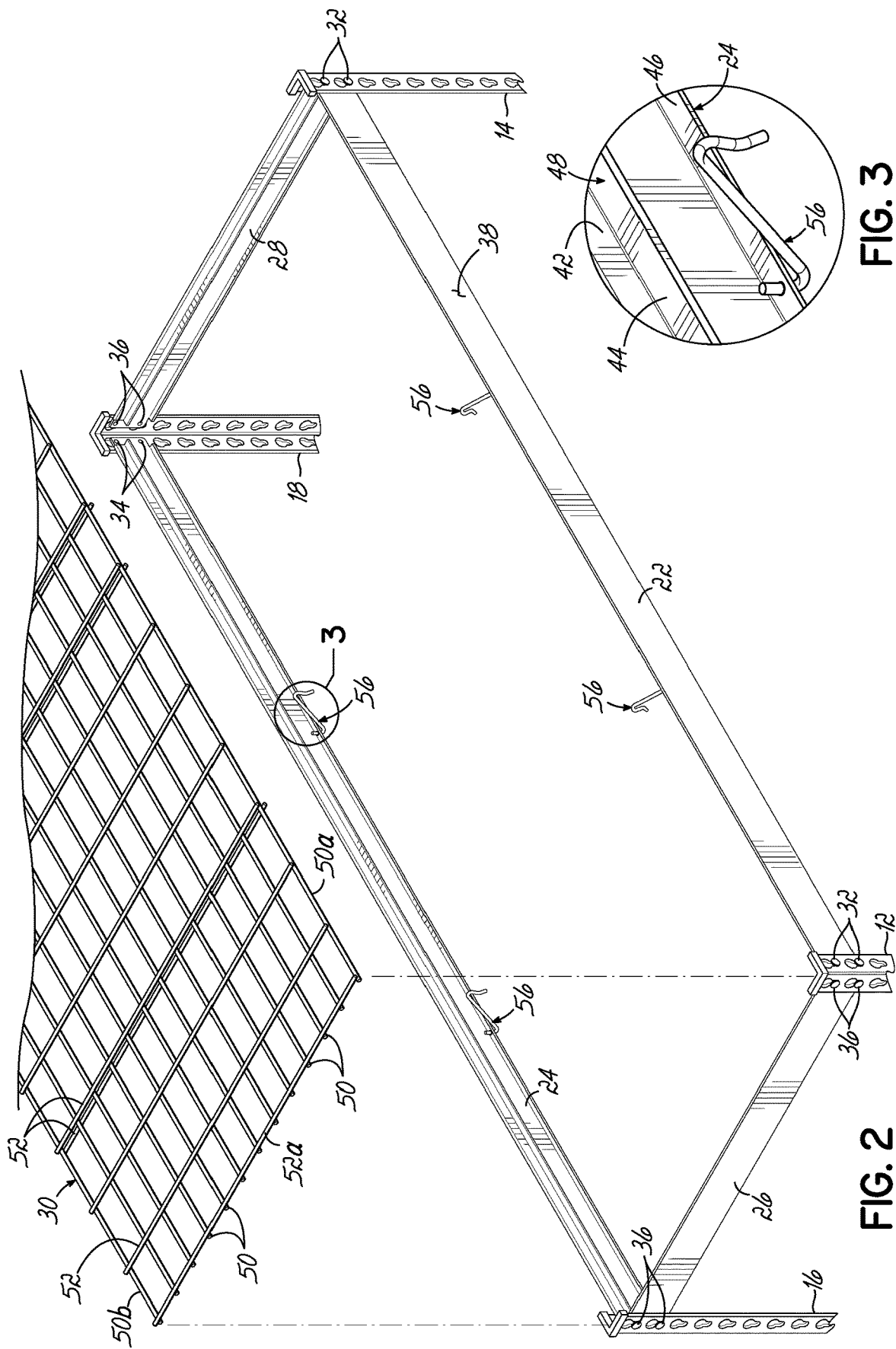

SHELVING UNIT WITH LOAD CAPACITY INCREASING TIE CLIPS

CROSS-REFERENCE TO RELATED APPLICATION

This application claims the benefit of and priority to U.S. Provisional Application No. 62/577,498 filed Oct. 26, 2017, the disclosure of which is incorporated by reference herein in its entirety.

TECHNICAL FIELD

The invention relates generally to metal shelving units, and more particularly to tie members, such as wire tie clips, used in metal shelving units having horizontal front and rear shelf supporting beams for increasing the load capacity of the shelving units.

BACKGROUND

Shelving units are generally well known in the industry. Such units typically include four vertical supporting posts arranged in a generally rectangular pattern, horizontal front and rear shelf supporting beams extending respectively between two front corner supporting posts and two rear corner supporting posts, and shorter side horizontal shelf supporting beams each extending between a front and a respective rear vertical corner supporting post on each side of the shelving unit. Preferably, a set of each front, rear and side shelf supporting beams is operatively disposed in a generally planar configuration in order to support a shelf having a typically horizontal shelf surface, or a plurality of interwoven or spaced wires (e.g., wire grid) to form a shelf capable of supporting a load.

In a conventional arrangement, such shelving units define multiple shelves and supporting beams one above the other with the corner supporting posts and shelf supporting beams of metal composition. Usually, for example, these components of posts and beams are formed of sheet metal or formed steel components and, in combination with shelves, are generally referred to as steel shelving or storage units.

While such metal shelving units are generally successful for their intended purpose and remain useful and popular with consumers, manufacturers and other providers continually strive to improve upon their design and load-carrying capacity. In this regard, it is generally desired to significantly increase the load capacity of shelving units without a significant increase in cost and/or weight. By way of example, it is generally desired to provide a shelving unit having a load carrying capacity of 6,000 pounds or greater, which is significantly in excess of that of current shelving units of similar construction to that described above.

In one solution, an inverted channel-shaped tie bar is positioned between the horizontal front and rear shelf supporting beams for shelf and structural support. For example, U.S. Pat. No. 9,375,102, which is incorporated by reference herein in its entirety, illustrates prior shelving units with tie bars. Another solution was recently proposed by the Assignee of the present invention, in which elongate metal tie rods were inserted between the lower flanges of the horizontal front and rear shelf supporting beams. In this solution, the inventors discovered that as the load on the shelf is increased beyond the original load carrying design capacity, a twisting action or torque is imposed on the front and rear shelf supporting beams that urge the upper longitudinal edge of the beams toward each other and the lower longitudinal edge of the beams away from each other, thus moving away from their original design positions.

This twisting presents undesirable structural responses and could lead to failure of the shelving unit. By way of example, undue twisting of the front and rear horizontal shelf supporting beams could separate the supporting interconnection of the shelves to the beams, allowing the beams to pull away from the shelves letting them drop, or could separate the beam ends from the corner posts, both potentially and catastrophically destroying the shelving unit. The inventors further discovered that by inserting a tie rod between the lower flanges of the front and rear shelf supporting beams, the twist or torque imposed by the increased loads could be counteracted or offset so as to maintain the original design positions of the front and rear beams, and thereby accommodate the increased loading of the shelving unit. More particularly, the tie rods prevent the lower longitudinal edges of the front and rear shelf supporting beams from moving away from each other as the loading on the shelving unit is increased. Such tie rods are more fully disclosed in U.S. Application Ser. No. 62/477,723, filed Mar. 28, 2017 and incorporated by reference herein in its entirety.

While tie rods according to the solution described above is generally successful, manufacturers continue to strive to provide improved and/or alternative solutions for increasing the load capacity of shelving units without significant cost and/or weight increases.

SUMMARY

A shelving unit includes front and rear shelf supporting beams, each beam including an upper shelf supporting flange that defines a shelf seat and a lower flange spaced from the upper flange, a shelf configured to be positioned in the seat defined by the front and rear shelf supporting beams, and at least one tie clip configured to be connected to the shelving unit between the shelf and the lower flange of at least one of the front and rear shelf supporting beams.

In an exemplary embodiment, the tie clip is generally S-shaped having a first hooked end, a second hooked end, and an intermediate portion extending therebetween. The lower flange of the at least one of the front and rear shelf supporting beams includes at least one hole, wherein the at least one hole is configured to receive the first hooked end of the at least one tie clip. The second hooked end of the at least one tie clip may include a resilient spring finger, wherein the resilient spring finger is configured to flex during connection of the at least one tie clip to the shelf.

Preferably, the shelving unit includes a plurality of tie clips that connect the front shelf supporting beam and the rear shelf supporting beam to the shelf. In an exemplary embodiment, the shelf may be formed as a wire shelf having a grid-like pattern of wires. The second hooked end of the at least one tie clip may be configured to connect around one of the wires of the wire shelf. The selected wire is preferably spaced from the edge of the shelf. In a further aspect, the shelving unit may include a pair of side shelf support beams, wherein each side support beam includes an upper shelf supporting flange that defines a shelf seat and a lower flange spaced from the upper flange.

In another embodiment, a shelving unit includes a pair of front corner posts and a pair of rear corner posts, and a plurality of shelf assemblies, each shelf assembly configured to adjustably couple to the front and rear corner posts. Each shelf assembly includes a front shelf supporting beam configured to extend between the front corner posts and a rear shelf supporting beam configured to extend between the rear corner posts, wherein each of the front and rear shelf supporting beams includes an upper shelf supporting flange that defines a shelf seat and a lower flange spaced from the upper flange. Each shelf assembly further includes a pair of side support beams, each configured to extend between a front corner post and a rear corner post, a shelf configured to be positioned in the seat defined by the front and rear shelf supporting beams, and a plurality of tie clips, each tie clip configured to be connected to the shelving unit between the shelf and the lower flange of the front and rear shelf supporting beams.

In yet another embodiment, a tie clip for connecting a shelf to a horizontal shelf supporting beam includes a first hooked end, a second hooked end, and an intermediate portion between the first and second hooked ends, wherein the second hooked end includes a resilient spring finger. The resilient spring finger is configured to provide a snap-fit connection of the shelf to the shelf supporting beam.

In a further embodiment, a method of assembling a shelving unit includes providing front and rear shelf supporting beams, each of the beams including an upper shelf supporting flange that defines a shelf seat and a lower flange spaced from the upper flange; inserting a shelf into the seat provided by the front and rear shelf support beams so as to engage the upper shelf supporting flange; and connecting at least one tie clip to the shelving unit so as to extend between the shelf and the lower flange of at least one of the front and rear shelf supporting beams.

In an exemplary embodiment, the at least one tie clip may be connected to the shelf at a location spaced from the edge of the shelf. The at least one tie clip may include a resilient spring finger that is flexed so as to snap fit into connection with the shelf. In one embodiment, the shelf is a wire shelf and the tie clip snap fits over a wire of the wire shelf. A plurality of tie clips may be connected to the shelving unit so as to extend between the shelf and the lower flange of the front and rear shelf supporting beams.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 2 is a partial disassembled perspective view of the shelving unit shown in FIG. 1;

FIG. 3 is an enlarged view of the encircled portion 3 in FIG. 2;

DETAILED DESCRIPTION

Figure 1:
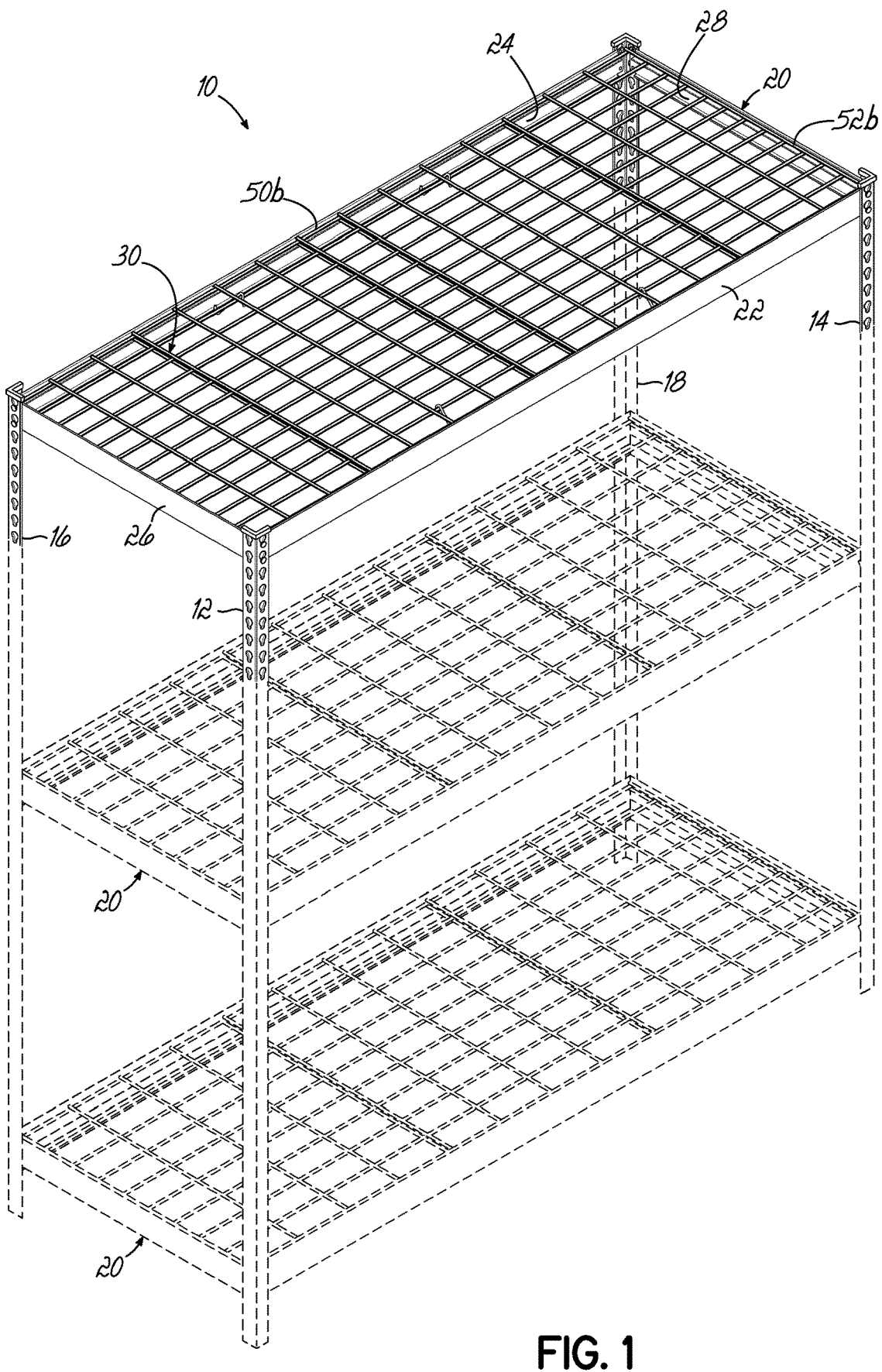
FIG. 1 is a perspective view of a shelving unit in accordance with an embodiment of the invention.

With reference to FIGS. 1 and 2, a shelving unit 10 typically referred to as a steel or storage shelving unit is illustrated. The shelving unit 10 includes a pair of front, spaced apart corner support posts 12, 14 and a pair of rear, spaced apart corner support posts 16, 18 arranged in a generally rectangular configuration. The shelving unit 10 includes at least one, and preferably multiple generally horizontal shelf assemblies 20 vertically spaced along the height of the corner support posts 12, 14, 16, 18. Each shelf assembly 20 includes a generally horizontal front shelf supporting beam 22, a generally horizontal rear shelf supporting beam 24, a pair of generally horizontal side support beams 26, 28, and a shelf 30. In an exemplary embodiment, the shelf 30 may take the form of a generally horizontal wire shelf, as illustrated in the figures. Other types of shelves, however, may be possible.

Each of the front shelf supporting beams 22 includes an elongate body extending between the pair of front corner support posts 12, 14, and post mounts 32 at opposing ends of the elongate body. The post mounts 32 are configured to adjustably connect the front shelfing supporting beams 22 to the corner support posts 12, 14 at a selected height. In an exemplary embodiment, the post mounts 32 may include pins, such as enlarged head and neck posts extending away from the beam and configured to be received in a key-hole slot in the front corner support posts 12, 14, as illustrated in the figures. Such posts and key-hole slots are well known in the shelving industry and will not be described in further detail. The invention is not limited to post mounts 32 as described above, as a host of post mounts may be used to adjustably couple the front shelf supporting beams 22 to the corner support posts 12, 14.

In a similar manner, each of the rear shelf supporting beams 24 includes an elongate body extending between the pair of rear corner support posts 16, 18, and post mounts 34 at opposing ends of the elongate body. The post mounts 34 are configured to adjustably connect the rear shelf supporting beams 24 to the corner support posts 16, 18 at a selected height. In an exemplary embodiment, the post mounts 34 are similar to that described above for post mounts 32. In addition to the above, each front corner support post 12, 14 may be connected to an adjacent rear corner support post 16, 18 by side support beams 26, 28, respectively. Each of the side support beams 26, 28 includes an elongate body (but typically shorter than the front and rear shelf supporting beams) extending between a front and rear corner support post, and post mounts 36 at opposing ends of the elongate body. The post mounts 36 are configured to adjustably connect the side shelf support beams 26, 28 to the corner support posts 12, 16, 14, 18, respectively, at a selected height. In an exemplary embodiment, the post mounts 36 are similar to that described above for post mounts 32. Furthermore, one or more braces (not shown) may be provided to further support the structural frame of the shelving unit 10. The corner support posts 12, 14, 16, 18, front and rear shelf supporting beams 22, 24, side shelf supporting beams 26, 28, and shelves 30 in use are assembled to provide a shelving unit 10 as is clearly shown in the figures.

Figure 4:
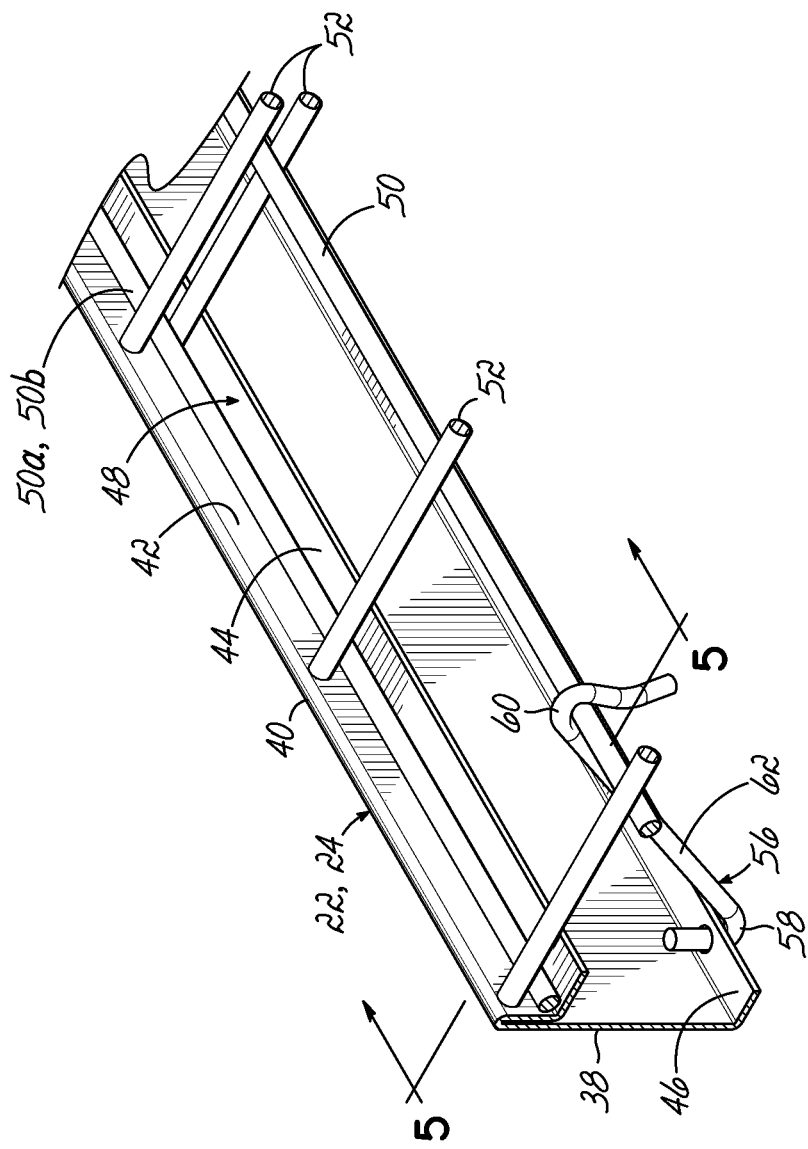
FIG. 4 is a partial perspective view of a front or rear shelf supporting beam in the shelving unit shown in FIG. 1.

In an exemplary embodiment, the front and rear shelf supporting beams 22, 24 have a similar cross-sectional profile, as best illustrated in FIGS. 3 and 4. In this regard, each of the shelf supporting beams 22, 24 includes an outward vertical face 38, an upper horizontal bend 40, an inner vertical face 42, an upper horizontal shelf supporting flange 44, and a lower horizontal flange 46 spaced from and below the upper shelf supporting flange 44. As illustrated in the figures, the upper horizontal shelf supporting flange 44 and the lower horizontal flange 46 extend inwardly of the vertical face 38 in a reference frame of an assembled shelving unit 10. Moreover, the upper horizontal shelf supporting flange 44 is offset from the upper horizontal bend 40 by the inner face 42 to define a shelf seat 48 configured to receive the edge or periphery of the shelf 30 therein. This is best illustrated in FIG. 4.

In an exemplary embodiment, the side supporting beams 26, 28 may also have a cross-sectional profile similar to the front and rear shelf supporting beams 22, 24 such that the shelf 30 is supported on all four sides of the shelf 30. Such an arrangement is shown in FIG. 2 for example. It should be recognized, however, that in an alternative embodiment (not shown) the side support beams 26, 28 may not support the shelf 30 directly, but instead operate to connect the front and rear corner posts and define the structural frame for the shelving unit 10.

In an exemplary embodiment, the shelf 30 may be configured as a wire shelf including a first plurality of elongate wires 50 extending in a first direction (e.g., width direction) and a second plurality of wires 52 extending in a second direction transverse to the first direction (e.g., a depth direction) to form a grid-like shelf 30. At one or more locations on the shelf 30, there may be two stacked transverse wires 52 such that the first elongate wires 50 are sandwiched between the stacked wires 52, as illustrated in FIG. 2 for example. The edges of the shelf 30 include edge wires 50a, 50b, 52a, 52b, which are configured to engage with the upper horizontal flanges 44 of the front and rear shelf support beams 22, 24, and optionally the side support beams 26, 28 when the shelf is positioned in the seat 48. It should be realized that aspects of the present invention are not limited to a wire shelf as shown and described herein, and that a wide variety of wire shelves may be used with the present invention.

In accordance with an aspect of the present invention, the shelving unit 10 includes one or more tie members that provide certain benefits to the use of shelving units. In this regard, the shelving unit 10 includes at least one tie clip 56, preferably a plurality of tie clips 56, that extend between a shelf 30 and one of the shelf supporting beams 22, 24, and possibly the side support beams, 26, 28. In an exemplary embodiment, the tie clips 56 extend between a shelf 30 and at least one of the front and rear shelf supporting beams 22, 24. Preferably, a plurality of the tie clips 56 extend between the shelf 30 and the front shelf supporting beam 22, and a plurality of the tie clips 56 extend between the shelf 30 and the rear shelf supporting beam 24.

In conventional shelving units, the shelves are positioned within the seat 48 created by the shelf support beams, but are not otherwise secured to the beams. Thus, in one beneficial aspect, the tie clips 56 create a positive connection between the shelves and the support beams. This positive connection prevents the shelves from unintentional and undesirable movement during use and during movement or transport of the shelving unit. Additionally, the inventors believe that the tie clips facilitate an increase in the load-carrying capacity of the shelving unit beyond that of conventional shelving units. In this regard, it is believed that the tie clips help maintain the original position of the beams as the shelves are loaded beyond their original capacity. More particularly, the inventors believe that the tie clips prevent the beams from twisting during high loading of the shelves such that the structural integrity of the shelving unit is maintained, and the load capacity of the shelving unit may be reliably increased without failure.

As best illustrated in FIGS. 3-5C, a tie clip 56 may be generally S-shaped, including a first hooked end 58, a second hooked end 60, and an elongate generally straight intermediate section 62 extending between the two ends 58, 60. The tie clips 56 may be formed from steel wire, for example, and have a generally circular cross-sectional profile. Other materials and cross-sectional profiles, however, may be possible within the scope of the invention. For purposes described below, the second hooked end 60 of the tie clip 56 may include a resilient spring finger 64 that is capable of flexing toward and away from intermediate section 62.

As noted above, each of the tie clips 56 extend between the shelf 30 and at least one of the shelf supporting beams 22, 24. More particularly, the tie clips 56 extend between the shelf 30 (such as one of the wires thereof) and a lower part of at least one of the shelf supporting beams 22, 24 spaced away from where the shelf makes contact with the beams 22, 24. By way of example, to maximize the anti-twisting or torqueing effect of the tie clips 56, the tie clips 56 may be coupled to at least one of the shelf supporting beams 22, 24 at the maximum distance from where the shelf 30 is supported on the shelf supporting beams 22, 24. Thus in an exemplary embodiment, the tie clips 56 may be coupled to the lower flange 46 of the shelf supporting beams 22, 24.

Figure 5A:
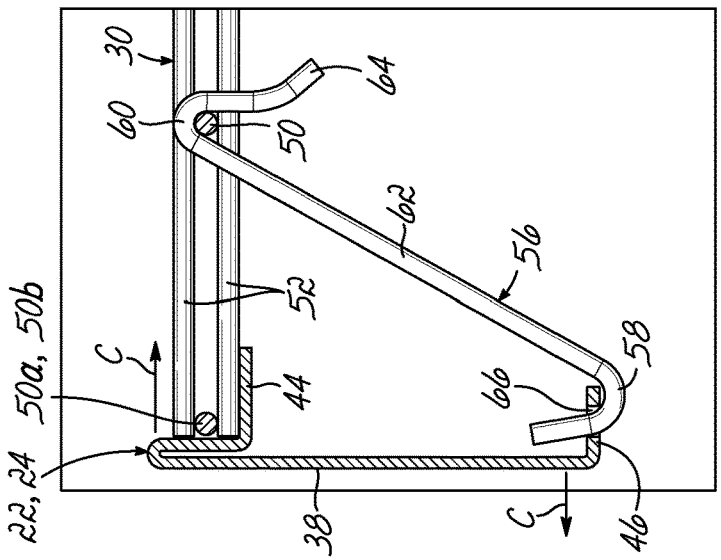
FIGS. 5A-5C are side views of tie clips being connected to the beams and shelves of the shelving unit.
Figure 5B:
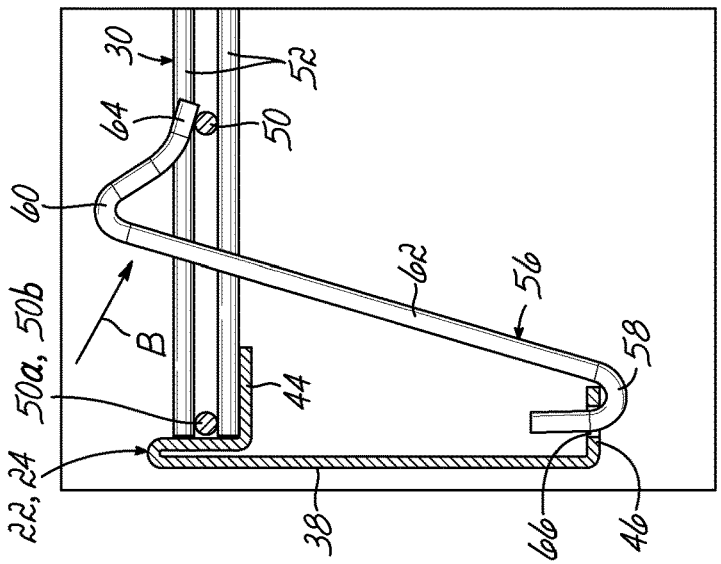
Figure 5C:
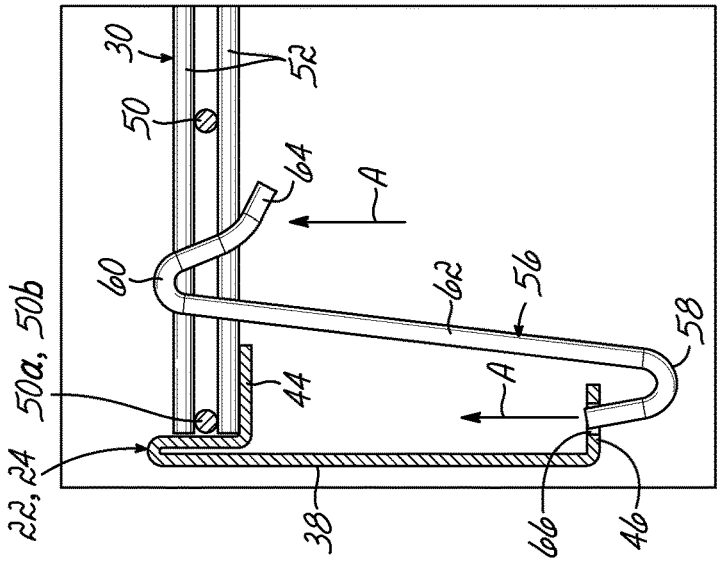

FIGS. 5A-5C illustrate an exemplary process of connecting the tie clips 56 to the shelving unit 10. In this regard, after the shelf 30 is positioned within the seat 48 provided by the shelf supporting beams 22, 24, and preferably by the shelf supporting beams 22, 24, 26, 28, the first hooked end 58 of the tie clip 56 may be connected to the lower flange 46. In particular, the lower flange 46 may include an opening hole 66 that is configured to receive the first hooked end 58 from below the lower flange 46, as illustrated in FIG. 5A. The tie clip 56 is then lifted upwardly such that the resilient spring finger 64 at the second hooked end 60 engages with a top portion of a wire 50 of the shelf 30, as illustrated in FIG. 5B. The wire 50 to which the tie clip 56 is configured to engage is preferably spaced from the edge wires 50a, 50b. By way of example, the tie clip 56 may be configured to engage with the first, second or third wire 50 spaced from the edge wire 50a or 50b (depending on which shelf supporting beam the tie clip is being engaged). To maintain the aesthetics and unobtrusiveness of the tie clips 56, the tie clips 56 may be configured to engage with the wire 50 immediately adjacent the edge wire 50a, 50b, as illustrated in FIGS. 5A-5C. In any event, once the second end of the tie clip 56 is positioned as shown in FIG. 5B, the second end of the tie clip 56 may be pressed away from the shelf supporting beam 22, 24, as illustrated by arrow B. This force causes the resilient spring finger 64 to slightly flex upwardly such that the tie clip 56 snap fits over the selected wire 50 and into its operational position as shown in FIG. 5C.

When the shelving unit 10, and more particularly the shelf 30, is loaded with high loads (e.g., beyond its normal capacity), in the normal course and as described above this tends to twist the support beams 22, 24 such that the upper end of the beams moving inwardly and the lower end of the beams 22, 24 move outwardly. This is illustrated by arrows C in FIG. 5C. As one might imagine, however, due to the presence of the tie clips 56, this twist in the support beams 22, 24 is prevented and the original position of the support beams 22, 24 is maintained. This in turn allows the load capacity of the shelving unit 10 to be increased, and perhaps significantly increased as compared to conventional designs. In an exemplary embodiment, a plurality of tie clips 56 may be used along each of the front and rear shelf supporting beams 22, 24. By way of example and without limitation, between 2-5 tie clips 56 may be spaced along each of the front and rear supporting beams 22, 24. Fewer or more tie clips 56, however, may be used depending on the particular application, such as the width of the shelving unit 10, as well as other factors.

In one aspect of the invention, the tie clips 56 are configured to be easily removed from the shelving unit 10, such as during disassembly of the shelving unit for example. In this regard, after the loads on the shelves 30 have been removed or reduced, a user may simply grab onto the resilient spring finger 64 at the second hooked end 60 of the tie clip 56 and flex it outwardly so as to flip the second hooked end 60 back over the wire 50 to which it is coupled. From here, the tie clip 56 may be lowered so as to remove the first hooked end 58 from the hole 66 in the lower flange 46 of the shelf supporting beams 22, 24. The shelving unit 10 may then be disassembled in the normal manner.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, while the tie clips were described herein as being used with wire shelving, the tie clips may also be used with solid shelves so long as the shelves include a hook or other connector that allows the second hooked end to be coupled thereto. Thus, the various features of the invention may be used alone or in any combination depending on the needs and preferences of the user.

What is claimed is:

1. A shelving unit, comprising:
   a pair of front corner posts and a pair of rear corner posts;
   a plurality of shelf assemblies, each shelf assembly configured to be adjustably coupled to the front and rear corner posts, each shelf assembly comprising:
   a front shelf supporting beam configured to extend between the pair of front corner posts;
   a rear shelf supporting beam configured to extend between the pair of rear corner posts, wherein the front and rear shelf supporting beams include an upper shelf supporting flange that defines a shelf seat and a lower flange spaced from the upper flange, wherein the lower flange of at least one of the front and rear supporting beams includes at least one hole;
   a pair of side support beams, each configured to extend between a front corner post and a rear corner post;
   a rigid shelf configured to be positioned in the seat and engage the upper shelf supporting flange of the front and rear shelf supporting beams; and
   a plurality of tie clips, each tie clip having a first hooked end, a second hooked end, and an intermediate portion extending therebetween, the first hooked end configured to be inserted into the at least one hole and the second hooked end configured to positively connect to the shelf.

2. The shelving unit according to claim 1, wherein each of the tie clips is S-shaped.

3. The shelving unit of claim 2, wherein the second hooked end includes a reverse bend.

4. The shelving unit according to claim 1, wherein the second hooked end of the tie clip includes a resilient spring finger.

5. The shelving unit of claim 4, wherein the shelf is a wire shelf and the resilient spring finger is configured to snap fit over a wire of the shelf.

6. The shelving unit of claim 5, wherein the resilient spring finger snap fits over the wire of the shelf at a location spaced from an edge of the shelf.

7. The shelving unit according to claim 1, wherein the shelf includes a wire shelf with a plurality of elongate wires, wherein the second hooked end of at least one of the plurality of tie clips hooks over at least one of the plurality of elongate wires.

8. The shelving unit of claim 1, further comprising a pair of side support beams, each of the side support beams including an upper shelf supporting flange and a lower flange spaced from the upper flange.

9. The shelving unit of claim 1, wherein the second hooked end is configured to positively connect to the shelf at a location spaced from an edge of the shelf.

10. The shelving unit of claim 1, wherein each of the front and rear shelf supporting beams includes an outward face having an upper edge and a lower edge, wherein the lower flange extends from the lower edge, wherein the upper edge includes an upper horizontal bend and an inner horizontal face, and wherein the upper flange extends from the inner horizontal face spaced from the upper horizontal bend.

11. A method of assembling a shelving unit, comprising:
    providing front and rear shelf supporting beams, each of the beams including an upper shelf supporting flange that defines a shelf seat and a lower flange spaced from the upper flange, wherein the lower flange includes plurality of holes;
    providing a plurality of tie clips, each tie clip having a first hooked end, a second hooked end, and intermediate portion extending therebetween;
    placing a rigid shelf onto the seat provided by the front and rear shelf supporting beams so as to engage the upper shelf supporting flange;
    inserting the first hooked end of each tie clip into one of the plurality of holes in the lower flange; and
    positively connecting the second hooked end of each tie clip to the shelf.

12. The method according to claim 11, wherein connecting the second hooked end of the tie clip to the shelf further comprises connecting the second hooked end of the tie clip to the shelf at a location spaced from an edge of the shelf.

13. The method according to claim 12, wherein connecting the second hooked end of the tie clip to the shelf further comprises resiliently flexing the second hooked end so as to snap fit the second hooked end into engagement with the shelf.

14. The method according to claim 13, wherein the shelf is a wire shelf and the second hooked end snap fits over a wire of the wire shelf.

* * * * *